United States Patent [19]
Leatherman

[11] 3,923,580
[45] Dec. 2, 1975

[54] FABRICATING METHOD AND ARTICLE FORMED THEREBY

[75] Inventor: Alfred F. Leatherman, Columbus, Ohio

[73] Assignee: William C. Heller, Jr., Milwaukee, Wis.

[22] Filed: May 22, 1973

[21] Appl. No.: 363,177

Related U.S. Application Data

[63] Continuation-in-part of Ser. No. 132,315, April 8, 1971, abandoned.

[52] U.S. Cl.............................. 156/272; 219/10.53
[51] Int. Cl.²..................... B29C 19/02; B23K 13/02
[58] Field of Search .......... 156/272, 69; 219/10.41, 219/10.43, 10.53

[56] References Cited
UNITED STATES PATENTS

| | | | |
|---|---|---|---|
| 2,393,541 | 1/1946 | Kohler | 156/272 |
| 3,460,310 | 8/1969 | Adcock et al. | 156/272 |
| 3,548,140 | 12/1970 | O'Neill | 156/69 |
| 3,574,031 | 4/1971 | Heller et al. | 156/272 |
| 3,620,875 | 11/1971 | Guglielmo | 156/272 |
| 3,700,513 | 10/1972 | Haberhauer et al. | 156/272 |
| 3,727,022 | 4/1973 | Hamilton | 156/272 |
| 3,730,804 | 5/1973 | Dickey | 156/272 |

*Primary Examiner*—Douglas J. Drummond
*Attorney, Agent, or Firm*—Andrus, Sceales, Starke & Sawall

[57] ABSTRACT

A technique for fabricating articles of thermoplastic material includes the steps of dispersing a particulate means heatable upon exposure to a high frequency field within one of the article parts, bringing that part and the other article parts together, and heating the first article part with a high frequency field to effect a thermal bond between the parts to form the completed thermpolastic article.

17 Claims, 8 Drawing Figures

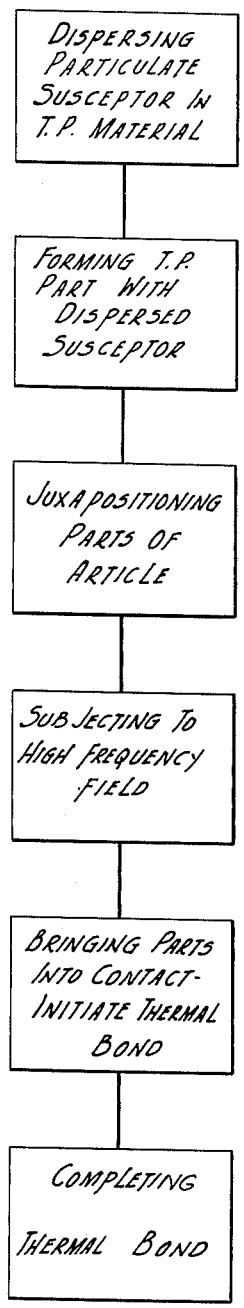
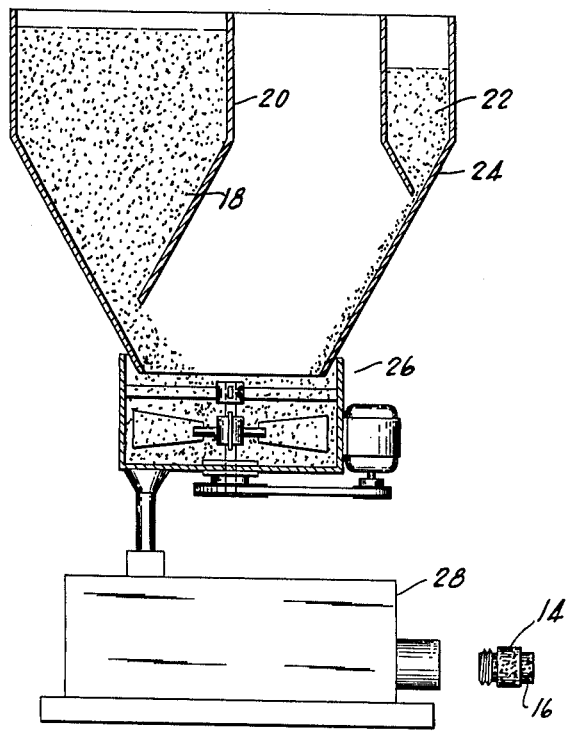
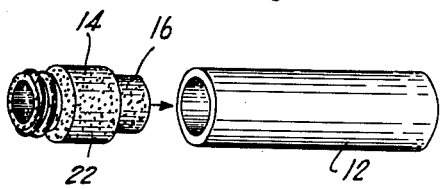
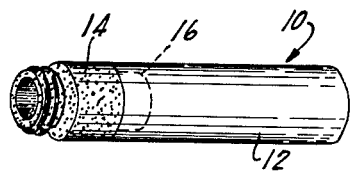
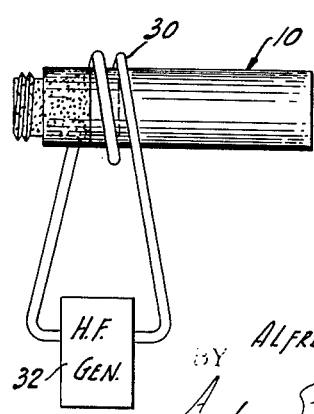
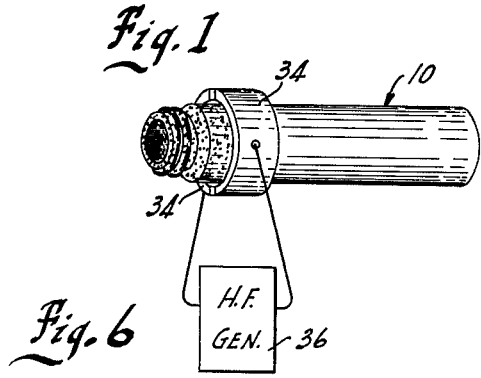
INVENTOR.
ALFRED F. LEATHERMAN
BY
Andrus, Sceales, Starke & Sawall
ATTORNEY

FABRICATING METHOD AND ARTICLE FORMED THEREBY

This application is a continuation-in-part of co-pending U.S. patent application Ser. No. 132,315, filed Apr. 8, 1971 now abandoned by the present inventor, entitled "FABRICATING METHOD AND ARTICLE FORMED THEREBY" and assigned to a common assignee.

BACKGROUND OF THE INVENTION

1. Field of the Invention

The present invention relates to the art of thermally joining thermoplastic materials.

2. Description of the Prior Art

It is common to form plastic articles by fabricating the articles from two or more component parts which are bonded together to provide the completed article. The feasibility of such an assembly technique often depends on the speed and economy with which the bonding process can be accomplished while the utility of the completed article resides in great measure on the strength and other mechanical properties of the inter-component bonds.

The component parts of such articles may be bonded together by adhesives. However, the use of adhesives can be both time consuming and expensive. As adhesives are usually applied in liquid form to one or both of the parts to be joined, application thereof must be closely regulated to control the amount and thickness of the applied adhesive. The bonding process must be slowed to a rate commensurate with the drying time of the adhesive. The expense of liquid adhesives is increased by factors such as the inventory necessary to obtain compatibility with various types of plastics, the shelf life of the adhesive, and the handling and treatment necessary to obtain viscosity control and freezing protection. For these reasons, attention has turned to the use of thermal joining methods, particularly in cases in which the component parts are thermoplastic in nature.

In thermal joining methods, the component parts may be heated to plasticity by such conventional heat transfer techniques as convection and radiation. However, the inefficiencies attendant convection or radiation heating are so great as to reduce processing speeds to the level of impracticality.

Because of the shortcomings of both adhesive and conventional heat transfer fabrication techniques, attention has turned to the use of indirect heating, as by a field of indirect energy. Typically, these methods involve the use of a susceptor substance, responsive to, and heatable by, indirect energy, such as a high frequency magnetic or electric field. The susceptor is placed between the component parts to be joined and indirect energy applied to the susceptor to raise its temperature and the temperature of the abutting portions of the component parts to effect a heat seal. Such a fabrication process provides the advantages of high speed and accurate temperature control among the many others.

In many industrial applications, it is desirable to reduce the number of elements which must be handled, and the number of manipulative steps which must be performed, to a minimum. This is particularly true where the formation of the article is carried out on high speed automatic or semiautomatic machinery. In such cases, the necessity of preparing and positioning the additional susceptor element or elements may prove detrimental and may prevent attainment of the desirable objectives of speed and economy in the fabrication process.

SUMMARY OF THE PRESENT INVENTION

It is, therefore, the object of the present invention to provide an improved fabrication technique for articles formed of thermoplastic material.

A salient feature of the present invention is the incorporation of the susceptor particles directly into at least one of the component parts of the article and in particular into a component part having a joinder portion for integral attachment to another article part and a non-joinder portion which extends laterally from said joinder portion. This may be accomplished by the use of a particulate susceptor means with the incorporation occurring during the formation of the component part. The part including the particles is subjected to an essentially localized heat source field which acts on the particles to form heat. The field is aligned with this joinder portion. The particles in the non-joinder portion do not form sufficient heat to produce unacceptable distortion and, in fact, contribute to the overall effectiveness of the bonding process. The necessity of handling a separate susceptor element during final processing is eliminated, thereby lending speed and economy to the fabrication process. The assembly of articles not otherwise economically formable is permitted.

One aspect of the present invention is directed to a method of fabricating articles in which one of the article parts has dispersed therein particulate means heatable upon exposure to a high frequency field. The article parts are brought into contact and the treated part subjected to a high frequency field to raise its temperature and thereby to form a heat seal at the contacting areas. The resulting bond is both mechanically strong and chemically inactive.

The invention is also directed to the provision of an article formed of a thermoplastic material having heat seal bonds with the aforesaid desirable properties.

BRIEF DESCRIPTION OF THE DRAWING

FIG. 1 is a block diagram showing the steps of the process of the present invention;

FIG. 2 is a schematic diagram showing initial steps in a fabricating process of the present invention;

FIGS. 3 and 4 show assembly steps in the process of the present invention and the article of the present invention;

FIG. 5 shows a terminal step in the process of the present invention;

FIG. 6 shows a modification of the process and article of the present invention;

DESCRIPTION OF THE PREFERRED EMBODIMENT

Figure 7:
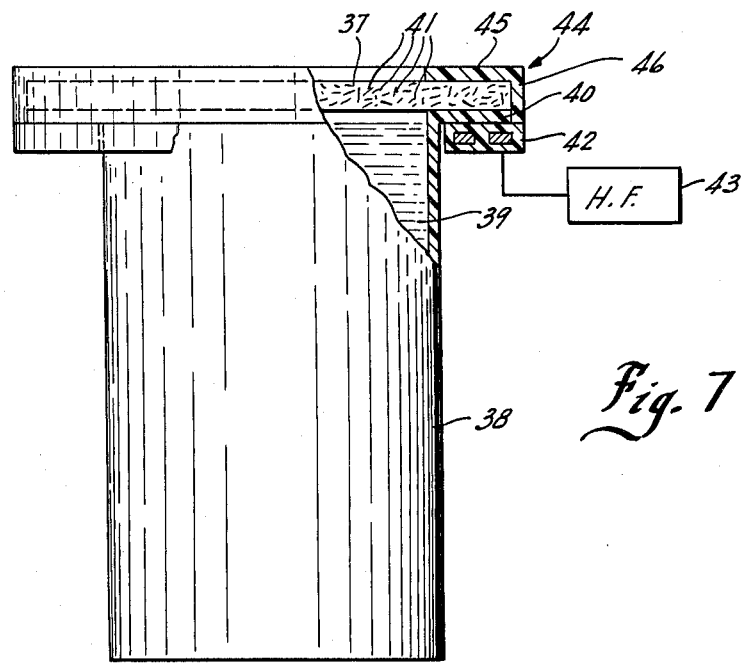
FIG. 7 is a side elevational view of the invention applied to application of a continuous lid member to a container.

The technique of the present invention is illustratively shown in the Figures, and described herein, in connection with the fabrication of a vial 10 from a pair of tubular thermoplastic members. As shown in FIG. 4, vial 10 is comprised of container portion 12 and closure portion 14. Closure portion 14 has collar 16 which fits inside container portion 12 and in connection with which a heat seal is formed to effect fabrication of the vial.

Either or both of container portion 12 and closure portion 14 may contain a dispersed particulate susceptor means. In the embodiment of the invention shown in the figures, closure portion 14 contains the dispersed particulate means, susceptible to heating upon exposure to a high frequency magnetic field.

The steps of the method of the present invention are shown in block diagram form in FIG. 1 and in schematic form in FIGS. 2 through 5.

The formation of the article part or parts containing the dispersed particulate susceptor material may be accomplished in many ways. For example, a concentrate may be prepared which contains a higher loading of the particulate susceptor material than is desired in the finished article part. This may typically be accomplished by milling together dry granular thermoplastic material in pelletized form and particulate susceptor material on heated rolls. The resulting product can be sheeted thin on rools and then subdivided for ease in handling. The concentrate so prepared may be added directly to the article part forming means, for example, the extruder mentioned below, in measured quantities with respect to additional, unloaded thermoplastic material so that the completed article part contains the desired amount of dispersed particulate susceptor material.

In another method, and as shown in FIG. 2, granulated thermoplastic material 18 stored in bin 20 and particulate susceptor means 22 stored in bin 24 may be dry mixed together in mixer 26. Depending on the type of thermoplastic material and susceptor particles 22 utilized, such mixing, or tumbling, may be sufficient. For other types of thermoplastic material and other degrees of dispersion, it may be necessary to pass the admixture through an extruder and regranulate the extruded material.

It is preferable to introduce a particulate susceptor means comprised of ferromagnetic oxide particles of a class consisting of $Fe_2O_3$, $Fe_3O_4$, and $CrO_2$ into closure portion 14. Gamma $Fe_2O_3$ and $CrO_2$ have been found particularly useful as susceptors. The unique utility of the aforesaid classes of material resides in the ability of the members to retain their heat generating ability even when reduced to submicron size. The use of such small particles facilitates their dispersion and the formation of the article parts. Particle sizes as small as 0.01 micron have been used. The aforesaid particulate means are heatable by a high frequency magnetic field.

The amount of such particulate susceptor means which must be added depends both on the type of particle used. However, rarely has it been found necesary to use more than 30% particulate susceptor means by weight with respect to the thermoplastic material, and the use of 10% by weight is common.

The thermoplastic material and particulate susceptor means admixture is passed through a forming means, such as a molding machine or an extruder, which forms an article part, such as closure portion 14.

The article part so formed is juxtapositioned with the other part or parts of the article so that the parts are contiguous along the area to be joined. In the case of vial 10, closure portion 14 is inserted in container portion 12 so that collar 16 is contiguous with the upper, open end of container portion 12, as shown in FIGS. 3 and 4.

The assembles article, for example, vial 10 is then inserted in a high frequency induction heating coil 30. Coil 30 is energized by high frequency alternating current power supply 32 so as to generate a high frequency magnetic field in the interior of the coil. A frequency range for the magnetic field of from o.4 to 6 megahertz has been found useful. The energization of coil 30 applies a high frequency magnetic field to closure portion 14 which generates heat in susceptor particles 22 causing the interior surface of collar 16 of closure portion 14 to become heater and softened to a level sufficient to form a heat seal or thermal fusion bond between collar 16 and container portion 12. To avoid unnecessary heating of closure portion 14, it is desirable to localize the magnetic field, as by the configuration of coil 30, to the area of collar 16.

The thermoplastic part 14 thus has the joinder area portion and a non-joinder area portion which projects laterally of the joinder area and possess non-joinder utility in the article. Further, the extended non-joinder portion of the part which also includes the heat generating particles interact with the localized field. Thus, such particles will serve as flux paths to minimize the reluctance of the field circuit. This will, therefore, significantly contribute to the rate of heating and, consequently, to the efficiency of the process. Compared to the prior art bonding method of using a separate thin film as an interposed joining layer containing the heat generating particles, Applicant has found in practice that the additional flux paths of the present invention permit a reduction in the necessary loading of the susceptors, for example, from a reduction of 30 to only 6% by weight has provided an essentially equivalent rate of heating. It is believed that the flux path improvement is not significant for bonding material generally classed as film (up to 0.010 inch in thickness), but does occur in various degrees of improvement for material over 0.010 inch thickness containing magnetic particles. This difference appears to result because the thin film does not provide an extension with the susceptor material located to maximize the flux return path from the area which is to be heated to a bonding condition.

Although the distributed particles in the non-joinder portion will also tend to form heating means, they are generally spaced outwardly from the concentrated or localized field source when the field is expanded. Consequently, they will not create heat of the same intensity and by appropriate control, the parts will maintain their integrity. Further, after the field is removed, the particles within the non-joinder area may contribute to the heat removal. Generally, the particles are formed of a suitable mangetic material which has a significantly better heat conductivity than thermoplastics and the like. Further, when an external chill means is provided, the particles may similarly contribute to the heat interchange. This characteristic would thus tend to neutralize any disadvantage associated with the heating of the non-joinder area and may, in fact, contribute to the rapid cooling in the highly heated interface joinder area.

If the article parts are not previously in direct contact, they may be brought into contact, at this time, to initiate the closure portion-container portion seal. Induction heating coil 30 is disconnected from high frequency generator 32 to terminate the heat generation in closure portion 14. Because of the efficiencies obtainable with the technique of the present invention, only a short period of time is required to obtain the necessary softening of closure portion 14. Times on the order of 0.1 seconds are common.

The article parts are held in contact until they have cooled sufficiently to complete formation of the bond. If desired or necessary, pressure may be applied to the upper end of container portion 12 either during or after heating to assist in the contacting of the parts and the formation of the bond. To further assist in the formation of the bond, the assembled parts may be cooled by air blasts or the like. However, it has been found that because of the rapid heating cycles and localized heat generation obtainable by the techniques of the present invention, the article portions often retain a chill usable for cooling areas of the article in which bonding occurs. This often eliminates the need for auxiliary cooling such as air blasts.

Figure 8:
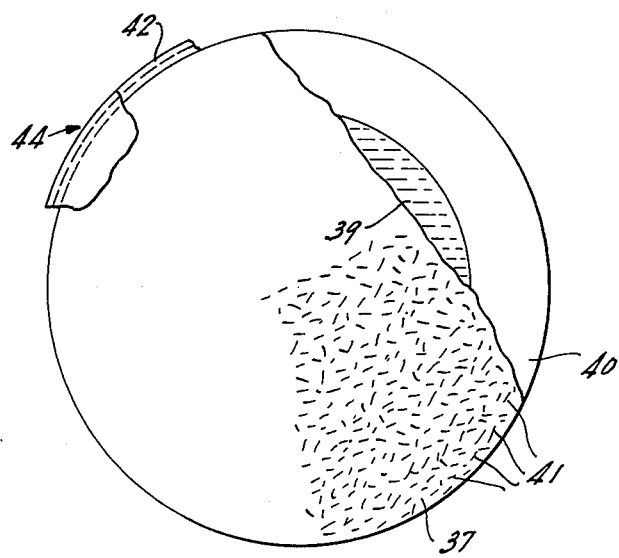
FIG. 8 is a plan view of FIG. 7 with parts broken away and sectioned.

Referring particularly to FIGS. 7 and 8, the present invention is shown applied to the attachment of a planar lid member 37 to flanged member 38.

In this further embodiment, member 38 is shown as a generally cylindrical, cup-shaped container within which a product 39 is sealed. The member includes a top flange 40 which is shown integrally formed with the container body and projects radially outwardly therefrom in a common plane. Lid member 37 is a flat, relatively thin lid which has an outer diameter essentially corresponding to that of flange 40.

The lid member 37 is attached to flange 40 in accordance with the teaching of the present invention as follows.

The lid member 37 is formed with particulate susceptor means 41 of suitable magnetic particles such as previously discussed, distributed throughout the member and thus including that portion lying in spaced relation to the flange 40 as well as that overlying the flange. For example, a large or elongated sheet stock of the lid material may be formed with the susceptor means 41 throughout, and a plurality of lid members 37 then punched or otherwise formed from the stock.

The lid member 37 is applied to the flanged member 38 with a suitable flat coil means 42 located beneath the flange 40. The coil means 42 is connected to a suitable high frequency source 43 and is preferably constructed as a suitable split coil unit to permit convenient placement and removal of the work member.

In the operation, the coil means 42 is energized to create the high frequency magnetic field which reacts with the magnetic particles 41 to generate heat as in the first embodiment. The particles 41 in the lid portion located inwardly of the flange 40 function in the same manner as the laterally extended portions of the preformed parts previously described.

The container and lid are formed of suitable thermoplastic such as a high density polyethylene or the like. The container, for example, may be 20 mils thick and the lid 1/16 inch or about 60 mils thick. A unit constructed of polyproplyene material and with the lid including 6% by weight of ferromagnetic oxide particles was sealed with a resulting fluid tight connection. Thus, the unit was subjected to a significant collapsing pressure without collapsing.

In the heating process, the lid portion aligned with the flange 40 may be heated to a flowable state. A suitable supporting mold member 44 is shown to support and maintain the lid configuration. The coil means 42 may abut the bottom wall of the flange 40 and provide the necessary vertical support. The mold member 44 is formed with a generally L-shaped cross-section having an upper wall 45 abutting the top of the lid in alignment with the flange 40 and a depending wall 46 abutting the vertical edge of the lid 37. The mold is formed of a suitable material such as an epoxy to permit ready and convenient separation from the formed part.

The heat is essentially concentrated in the flange area and can be applied without the necessity of supporting the central lid portion even though such portion also contains the susceptor particles 41.

While the present invention has been described for illustrative purposes in connection with the manufacture of a container, it will be understood that the techniques of the present invention have utility in a large number of applications. It will further be appreciated that modification of the above described invention can be made. As noted supra, the particulate susceptor means may be dielectrically heatable by a high frequency electric field formed between two plate-like electrodes 34 connected to high frequency generator 36 as shown in FIG. 6. The electrodes may be shaped to conform to the configuration of the article portions undergoing fabrication and to localize the electric field. The particulate susceptor means may comprise a halogenated polymer, such as the polymers and copolymers of vinyl chloride, vinyl fluoride, vinylidene chloride, and vinylidene fluoride. In another modification, the sequence in which the steps in the process are carried out may be altered.

It is therefore desired to include within the appended claims all such modifications and embodiments as come within the spirit and scope of the claims.

Various modes of carrying out the invention are contemplated as being within the scope of the following claims, particularly pointing out and distinctly claiming the subject matter which is regarded as the invention.

I claim:

1. A method of fabricating articles by thermally joining contiguous areas of at least first and second integral thermoplastic article parts, each of said parts having a joinder area portion and a non-joinder area portion, said method comprising the steps of:

dispersing a particulate susceptor heatable upon exposure to a high frequency field in a thermoplastic material to define a modified thermoplastic material;

forming the modified thermoplastic material into a first integral self-supporting article part having said joinder area portion completely including said susceptor and said non-joinder area portion completely including said susceptor, said self-supporting article part possessing utility in the article;

juxtapositioning the first article part and the second article part so that the joinder area portions thereof are in close contact and said non-joinder area portion of said first article part projects laterally outwardly from said joinder area and said second article part having said non-joinder area projecting laterally outwardly from said joinder area portion in spaced relation to said non-joinder area portion of said article part, said non-joinder area portions defining spaced and separate self-supporting elements of the article possessing utility;

aligning of a high frequency source means essentially only with the joinder area, and briefly exposing the joinder area portion of the first article part to the localized high frequency field with the adjacent lateral non-joinder area portion forming a field return path extended from the joinder area portion to raise the temperature of the surface of the joinder area contacting the second article part to a thermally bondable temperature and minimizing of heat generation and thermal distortion in the non-joinder portion of the first article part; and retaining the first and second article parts in contact until the parts are thermally joined into a single integrated article.

2. The method of claim 1 wherein the exposure step is further defined as exposing the joinder area portion of the first article part to the localized high frequency field for a time period of sufficient duration to heat the surface of the joinder area to bondable temperatures, said particles forming heat removal paths to remove heat from the joinder area to assist in cooling the joinder area surface.

3. The method of claim 1 wherein the joinder area portion of the first article part is formed as a projection and wherein the second article part is formed to surround the joinder area portion after juxtapositioning thereby to permit a rapid raising of the surface temperature of the joinder area portion to thermal bonding temperatures while retaining the chill of the article in other portions and parts.

4. The method of claim 1 further defined as a method for making hollow containers wherein said second article part is formed as a hollow container body having a neck for internally receiving a closure member and wherein said first article part is formed as the closure member having a tubular projection for insertion inside the neck of the container body to define said joinder area, and said non-joinder area portions of both said first and second parts extend in opposite directions from said joinder area portion, said source means in encircling alignment with said joinder area.

5. The method of claim 1 wherein said first part has a thickness in the joinder area portion of at least 0.010 inches.

6. The method of claim 1 wherein the initial step is further defined as dispersing the particulate means in a selected portion of the thermoplastic material in amounts in excess of that desired in the formed first part, and then adding additional quantities of thermoplastic material prior to completely forming the first part.

7. The method of claim 1 wherein the steps of producing the first part are further defined as dispersing a particulate means heatable upon exposure to a high frequency magnetic field in the first part.

8. The method of claim 7 wherein he steps of producing the first part are further defined as dispersing up to 30% by weight of particulate means in the thermoplastic material forming the first part.

9. The method of claim 8 wherein the steps of producing the first part are further defined as dispersing up to 10% by weight of particulate means in the thermoplastic material forming the first part.

10. The method of claim 7 further defined as subjecting the first part to a magnetic field having a frequency of from 0.4 to 6 megahertz.

11. The method of claim 7 further defined as dispersing a particulate means comprising ferromagnetic particles selected from a class consisting of $Fe_2O_3$, and $CrO_2$ in the thermoplatic material.

12. The method of claim 11 further defined as dispersing ferromagnetic particles selected from a class consisting of $Fe_2O_3$ and $CrO_2$ in the thermoplastic material.

13. The method of claim 7 further defined as dispersing particulate means having a minimum particle size of 0.01 microns in the thermoplastic material.

14. The method of claim 1 wherein a first tubular member having a flange about an opening defines the second article part and a lid member attached to the flange and spanning the opening defines the first part including said susceptor dispersed therein.

15. The method of claim 14 having support means applied to the several surfaces in the area of the flange.

16. The method of claim 14 having the coil means located beneath and in abutting relation to the flange.

17. The method of claim 16 having a supporting mold including a top wall and a depending sidewall, said top wall abutting the lid and the sidewall abutting the edge of the lid.

* * * * *

UNITED STATES PATENT AND TRADEMARK OFFICE
CERTIFICATE OF CORRECTION

PATENT NO. : 3,923,580
DATED : December 2, 1975
INVENTOR(S) : ALFRED F. LEATHERMAN It is certified that error appears in the above-identified patent and that said Letters Patent are hereby corrected as shown below:

Column 1, Line 6, after "1971" insert a comma --- , --- and after "abandoned" insert a comma --- , ---;

Column 3, Line 24, after "on" cancel "rools" and insert --- rolls ---;

Column 3, Line 54, after "of" insert --- plastic used and its thermoplasticity and the type of ---;

Column 3, Line 55, after "found" cancel "necesary" and insert --- necessary ---;

Column 4, Line 3, before "article" cancel "assembles" and insert --- assembled ---;

Column 4, Line 8, cancel "o.4" and insert --- 0.4 ---;

Column 4, Line 13, after "become" cancel "heater" and insert --- heated ---;

Column 4, Line 34, cancel "30" and insert --- 30% ---;

UNITED STATES PATENT AND TRADEMARK OFFICE
CERTIFICATE OF CORRECTION

PATENT NO. : 3,923,580
DATED : December 2, 1975
INVENTOR(S) : ALFRED F. LEATHERMAN It is certified that error appears in the above identified patent and that said Letters Patent are hereby corrected as shown below:

Column 4, Line 54, after "suitable" cancel "mangetic" and insert --- magnetic ---;

Column 8, Line 24, CLAIM 11 before "material" cancel "thermoplatic" and insert --- thermoplastic ---;

Signed and Sealed this twenty-third Day of March 1976

[SEAL]

Attest:

RUTH C. MASON
Attesting Officer

C. MARSHALL DANN
Commissioner of Patents and Trademarks